United States Patent
Andresen et al.

(10) Patent No.: US 12,060,491 B2
(45) Date of Patent: Aug. 13, 2024

(54) BITUMINOUS COMPOSITIONS COMPRISING AN AMINE ADDITIVE AND A HYDROXIDE, THEIR PREPARATION PROCESS AND APPLICATIONS

(71) Applicant: TOTAL MARKETING SERVICES, Puteaux (FR)

(72) Inventors: Thomas Andresen, Hochdonn (DE); Stefan Oest, Itzehoe (DE); Soenke Schroeder, Itzehoe (DE)

(73) Assignee: TOTALENERGIES ONETECH, Courbevoie (FR)

( * ) Notice: Subject to any disclaimer, the term of this patent is extended or adjusted under 35 U.S.C. 154(b) by 113 days.

(21) Appl. No.: 16/499,365

(22) PCT Filed: May 7, 2018

(86) PCT No.: PCT/EP2018/061686
§ 371 (c)(1),
(2) Date: Sep. 30, 2019

(87) PCT Pub. No.: WO2018/206489
PCT Pub. Date: Nov. 15, 2018

(65) Prior Publication Data
US 2021/0115255 A1   Apr. 22, 2021

(30) Foreign Application Priority Data

May 9, 2017 (EP) ..................... 17305524

(51) Int. Cl.
| | | |
|---|---|---|
| C08L 95/00 | (2006.01) | |
| C08K 3/22 | (2006.01) | |
| C08K 5/17 | (2006.01) | |
| C08K 5/20 | (2006.01) | |
| C08L 23/08 | (2006.01) | |
| C08L 33/08 | (2006.01) | |

(52) U.S. Cl.
CPC ........... *C08L 95/00* (2013.01); *C08L 23/0853* (2013.01); *C08L 33/08* (2013.01); *C08K 2003/2224* (2013.01); *C08K 5/17* (2013.01); *C08K 5/20* (2013.01)

(58) Field of Classification Search
None
See application file for complete search history.

(56) References Cited

U.S. PATENT DOCUMENTS

| | | | | |
|---|---|---|---|---|
| 3,634,293 A * | 1/1972 | Bontiz | ..................... | C08L 23/02 524/8 |
| 4,282,127 A * | 8/1981 | Desgouilles | ............ | C08L 95/00 524/68 |
| 5,120,777 A * | 6/1992 | Chaverot | ................. | C08L 95/00 524/68 |
| 5,437,717 A * | 8/1995 | Doyle | ..................... | C08L 95/00 106/220 |
| 5,437,923 A * | 8/1995 | Kalkanoglu | ............. | C08K 3/38 442/140 |
| 5,496,400 A | 3/1996 | Doyle et al. | | |
| 6,069,178 A | 5/2000 | Layrisse et al. | | |
| 2007/0289489 A1 * | 12/2007 | Wissel | ................. | C08L 95/005 106/277 |

FOREIGN PATENT DOCUMENTS

| | | | | |
|---|---|---|---|---|
| CN | 102558887 A | | 7/2012 | |
| CN | 103804929 A | * | 5/2014 | |
| CN | 104861672 A | | 8/2015 | |
| EP | 0570746 A2 | * | 11/1993 | .......... C08L 23/0869 |
| FR | 3021662 A1 | * | 12/2015 | ............. C08L 91/00 |
| GB | 816669 A | * | 7/1959 | ............ C08L 95/005 |
| GB | 1272112 A | * | 4/1972 | |
| JP | 2000104077 A | * | 4/2000 | |
| SU | 321496 A | * | 4/1970 | |
| SU | 617461 A1 | * | 7/1978 | |
| WO | 2006/009793 A1 | | 1/2006 | |
| WO | WO-2015181506 A1 | * | 12/2015 | ............. C08L 91/00 |

OTHER PUBLICATIONS

EP0570746 A2, Derwent Ab., Nov. 1993 (Year: 1993).*
SU-617461-A1, Jul. 1978, Derwent Ab. (Year: 1978).*
CN-103804929-A, May 2014, Machine translation (Year: 2015).*
FR-3021662-A1, Dec. 2015, Machine Translation (Year: 2015).*
SU 321496 A,, Apr. 1970, Derwent Ab. (Year: 1970).*
JP-2000104077-A, Apr. 2000, machine translation (Year: 2000).*
WO-2015181506-A1, Dec. 2015, machine translation (Year: 2015).*
International Search Report, dated Jul. 5, 2018, corresponding to International Application No. PCT/EP2018/061686.

* cited by examiner

*Primary Examiner* — Satya B Sastri
(74) *Attorney, Agent, or Firm* — LADAS & PARRY LLP; Malcolm J. MacDonald, Esq.

(57) ABSTRACT

The invention concerns bituminous compositions comprising:
 a bitumen,
 a hydroxide XOH, with X=Na, Ca, Mg, Li or K, and
 at least one amine additive selected from amines, diamines, polyamines, alkyl amido amines, amidopolyamines and imidazolines,
wherein said bituminous composition is substantially free of saponifiable and saponified carboxylic acids, meaning that, if present, the weight of saponifiable and saponified carboxylic acids represents at most 0.01% of the total weight of said bituminous composition
and the bitumen represents at least 60% by weight of said bituminous composition,
their preparation process and their use in road applications.

12 Claims, No Drawings

BITUMINOUS COMPOSITIONS COMPRISING AN AMINE ADDITIVE AND A HYDROXIDE, THEIR PREPARATION PROCESS AND APPLICATIONS

The present invention belongs to the field of bituminous compositions. More specifically, it relates to bituminous compositions comprising both an amine additive and a hydroxide and their process of preparation. The invention also relates to the use of these bituminous compositions in the field of road applications.

The use of bitumens in the manufacture of materials for road and industrial applications has been known for a long time: bitumen is the main hydrocarbon binder used in the field of road construction or civil engineering.

The bitumen can be introduced in the form of a bituminous composition or in in the form of a bituminous emulsions with water. The bituminous emulsions are applied at a temperature lower than 80° C., whereas the bituminous compositions are qualified as hot bitumen binder and are applied at higher temperatures, commonly in the range 80 to 240° C. Conventionally, the term "bituminous composition" does not encompass the bituminous emulsions.

Bituminous compositions are used as bituminous binders, in these different applications, providing they fulfill the required mechanical and/or dynamic characteristics. The mechanical properties of the bituminous compositions are determined by standardized tests of the different mechanical characteristics, such as the softening point, the penetrability and the rheological characteristics in predetermined tension.

The bituminous binders are sensitive to oxidation, given the presence of aromatic and unsaturated compounds in the bitumen. As a result, the mechanical properties decrease over time. In road applications, for instance, this decrease of mechanical properties appears as crackings formation, potholes on the roads, granulates discharge. So, it is desired to maintain, as most as possible, the mechanical properties over time of a bituminous binder.

As underlined in U.S. Pat. No. 5,437,717, various additives such as polymers and tall oil, have been utilized for the purpose of improving the high and low temperature characteristics of bituminous compositions, as well as to improve their toughness and durability. U.S. Pat. Nos. 5,437,717, 5,496,400 and CN 102558887 proposed to use a combination of additives including a saponifiable carboxylic acid, in particular from tall oil, with a strong base for saponifying them, as cross-linking agent. In U.S. Pat. No. 5,437,717, fatty amines were added, for improving the saponification of tall oil and rendering compatible the tall oil with the bitumen (see col. 4 lines 49-51). The compositions described in these documents contain an important level of saponifiable or saponified carboxylic acid i.e. higher than 0.01% by weight, based on the total weight of the bituminous composition.

In this context, there is always a need to provide bituminous compositions which, when used as a bituminous binder, exhibit a satisfactory stability over time and/or over external solicitations, with respect to their mechanical properties. In particular, such suitable properties are the stability over time and/or over heat and air, of the softening temperature and/or of the penetrability of the bituminous compositions. Thus, the purpose of the present invention is to provide new bituminous compositions leading to bituminous binders with improved stability over time, without a deterioration of their mechanical properties. In particular, when the new bituminous compositions are used in bituminous mix for roads comprising aggregates, the adhesive force and the resistance to crackings and potholes formation, have to be at least maintained.

The present invention is related to bituminous compositions comprising:
- a bitumen,
- a hydroxide XOH, with X=Na, Ca, Mg, Li or K, and
- at least one amine additive selected from amines, diamines, polyamines, alkyl amido amines, amidopolyamines and imidazolines,
- wherein said bituminous compositions are substantially free of saponifiable and saponified carboxylic acids, and the bitumen represents at least 60% by weight of said bituminous compositions.

According to particular embodiments, in the bituminous compositions according to the invention:
- the bitumen represents from 79 to 99.98% by weight, preferably from 86 to 99.98% by weight, and more preferentially from 90 to 99.9% and more preferentially from 92.8 to 99.8% by weight, of bitumen, of said bituminous compositions; and/or,
- the amine additive represents at most 3% by weight, preferably from 0.01 to 2% by weight, and more preferentially from 0.05 to 1% by weight, and more preferentially from 0.1 to 0.5% by weight, of said bituminous compositions; and/or
- the hydroxide XOH with X=Na, Ca, Mg, Li or K represents at most 3% by weight, preferably from 0.01 to 2% by weight, and more preferentially from 0.05 to 1% by weight, and more preferentially from 0.1 to 0.7% by weight, of said bituminous compositions.

In particular, the amine additive is selected from:
Amines of formula (I):

(I)

wherein:
R is a saturated or unsaturated, substituted or unsubstituted, optionally branched or cyclic, hydrocarbon radical with 8 to 24 carbon atoms, for example derived from tallow fatty acids, or tall oil fatty acids; and
$R_1$ and $R_2$ can be the same or different and are selected from hydrogen or hydrocarbon radical with 1 to 24 carbon atoms; $R_1$ and $R_2$ are preferably selected from hydrogen or methyl;

Diamines and Polyamines of formula (II):

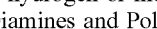

(II)

wherein:
R has the same meaning as in (I) above,
L represents a linear or branched hydrocarbon radical with 1 to 6 carbon atoms, for instance L is —$(CH_2)_m$— with m=1, 2 or 3 and,
n is an integer greater than or equal to 1, in particular n is an integer from 1 to 6;

Alkyl Amido amines of formula (III):

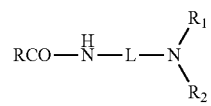

(III)

wherein R, $R_1$, $R_2$ and L have the same meaning as in (I) and (II), above:

Amidopolyamines of formula (IV) and Imidazolines:

$$RCO-(NH-L)_p-NH_2 \quad (IV)$$

wherein R and L have the same meaning as in (I) and (II) above, and p is an integer greater than or equal to 1, in particular p is an integer from 1 to 10.

Advantageously, the amine additive is selected from amines, diamines, polyamines, alkyl amido amines and amidopolyamines including a fatty chain.

According to a specific embodiment, the amine additive is an amidopolyamine including a fatty chain of formula:

$$RCO-[NH-L]_p-NH_2 \quad (IV)$$

where:
- p is an integer greater than or equal to 1, in particular p is an integer from 1 to 10,
- L is a linear or branched hydrocarbon radical with 1 to 6 carbon atoms, for instance L is $-(CH_2)_m-$ with m=1, 2 or 3,
- R is a saturated or unsaturated, substituted or unsubstituted, optionally branched hydrocarbon radical with 8 to 24 carbon atoms.

In particular, the amine additive of the composition is a mixture of amidopolyamines of formula (IV) in which p is an integer from 1 to 10, L is $-(CH_2)_2-$, and R are the hydrocarbon chains of the fatty acids of tall oil.

Advantageously, the hydroxide XOH is selected from NaOH and KOH, and is preferably NaOH.

In some embodiments, said bituminous compositions also comprise an olefinic polymer. In particular, the olefinic polymer is chosen among:

(a) the copolymers of ethylene and glycidyl (meth) acrylate chosen from random and block copolymers, preferably statistic copolymers, of ethylene and a monomer selected from glycidyl acrylate and glycidyl methacrylate, comprising from 50% to 99.7% by weight, preferably from 60% to 95% by weight, more preferably from 60% to 90% by weight of ethylene;

(b) the terpolymers of ethylene, monomer A and monomer B chosen from random and block terpolymers, preferably statistic terpolymers, of ethylene, a monomer A and a monomer B; the monomer A being selected from vinyl acetate, $(C_1-C_6)$alkyl acrylates and $(C_1-C_6)$alkylmethacrylates and the monomer B being selected from glycidyl acrylate and glycidyl methacrylate; in particular, the terpolymers ethylene/monomer A/monomer B comprising from 0.5% to 40% by weight, preferably from 5 to 35% by weight, more preferably from 10% to 30% by weight of units resulting from monomer A and from 0.5% to 15% by weight, preferably from 2.5% to 15% by weight of units resulting from monomer B, the rest being formed by units derived from the ethylene;

(c) the copolymers resulting from the grafting of a monomer B selected from glycidyl acrylate and glycidyl methacrylate, on a polymer substrate; in particular, the polymer substrate comprises a polymer selected from polyethylenes, especially low-density polyethylenes, polypropylenes, random or block copolymers, preferably statistic copolymers, of ethylene and vinyl acetate, random or block copolymer, preferably statistic copolymers, of ethylene and $(C_1-C_6)$alkylacrylate or $(C_1-C_6)$alkylmethacrylate; advantageously, the copolymers of ethylene and vinyl acetate or of ethylene and $(C_1-C_6)$alkylacrylate or $(C_1-C_6)$alkylmethacrylate comprise from 40% to 99.7% by weight, preferably from 50% to 99% by weight of ethylene; in particular, such grafted copolymers comprise from 0.5% to 15% by weight, preferably from 2.5% to 15% by weight of grafted units resulting from the monomer B.

In some embodiments which can be combined with the previous ones, said bituminous compositions also comprise an elastomer, preferably a crosslinked elastomer.

The invention also concerns a process for the preparation of a bituminous composition according to the invention wherein the following components are mixed at a temperature in the range of 90 to 230° C., preferably of 120° to 200° C.:
- a bitumen,
- a hydroxide XOH with X=Na, Ca, Mg, Li or K and,
- an additive selected from amines, diamines, polyamines, alkyl amido amines, amidopolyamines and imidazolines.

In some embodiments, an olefinic polymer and/or an elastomer, preferably a crosslinked elastomer, is(are) also mixed with the other components.

Bituminous mixes comprising, and more precisely consisting in, a bituminous composition according to the invention, with aggregates and optionally inorganic and/or synthetic fillers, as well as asphalts comprising, and more precisely consisting in, a bituminous composition according to the invention, with inorganic and/or synthetic fillers, form also part of the invention.

The use of a bituminous composition according to the invention, in road applications, in particular for the manufacture of hot bituminous mixes, asphalts, surface coatings, materials for the construction and the maintenance of road foundations and their surfacing or for road works, is another aspect of the invention.

The invention also concerns a method for improving the stability under solicitations of the penetrability at 25° C. measured according to EN 1426 and/or for improving the stability of the ring-and-ball softening temperature measured according to EN 1427 of a bituminous composition, comprising a bitumen and optionally an olefinic polymer and/or an elastomer, wherein the improvement is obtained by incorporation in the bituminous composition of a hydroxide XOH, with X=Na, Ca, Mg, Li or K and of an amine additive selected from amines, diamines, polyamines, alkyl amido amines, amidopolyamines and imidazolines, in particular as defined in the specification. The conditions of solicitations are, for instance, defined in EN 12607-1 and EN 14769. Advantageously, in the said method, the said bituminous composition is as defined in the invention.

According to another aspect, the invention is relative to a method for reducing the $H_2S$ emission or content of a bituminous composition, comprising a bitumen and optionally an olefinic polymer and/or an elastomer, wherein the reduction is obtained by incorporation in the bituminous composition of a hydroxide XOH, with X=Na, Ca, Mg, Li or K and of an amine additive selected from amines, diamines, polyamines, alkyl amido amines, amidopolyamines and imidazolines, in particular as defined in the specification. Advantageously, in the said method, the said bituminous composition is as defined in the invention.

According to the invention, an amine additive and a hydroxide XOH, with X=Na, Ca, Mg, Li or K, are introduced in a bituminous composition. In comparison with the same bituminous composition but without these two additives, the incorporation of these two additives improves the conservation of the mechanical properties of the obtained bituminous binder, and in particular of its penetrability and/or its softening temperature, under external solicitations: ageing and/or utilisation conditions. When compared with a bituminous composition of the same grade, the penetrability and/or the softening temperature are even improved. Additionally, when the new bituminous compositions are used in bituminous mix for roads comprising aggregates, the adhesive force and the resistance to crackings and potholes formation, are maintained or even improved.

The characteristics and advantages of the present invention will emerge more clearly from the description which will follow.

Bitumen

The bituminous composition according to the invention can comprise one or more bitumen(s). The bitumen used in the invention includes the bitumens of natural origin, those contained in natural deposits of bitumen, natural asphalt or tar sands and the bitumens obtained from the refining of crude oil. The bitumen used in the invention is advantageously chosen from the bitumens from the refining of crude oil, particularly from the bitumens containing asphaltenes. The bitumen may be obtained by conventional methods of bitumen manufacturing in a refinery, in particular by direct distillation and/or vacuum distillation of oil.

It is in particular, standard to carry out the vacuum distillation of the atmospheric residues originating from the atmospheric distillation of crude oil. This manufacturing process consequently corresponds to the sequence of an atmospheric distillation and of a vacuum distillation, the feedstock feeding of the vacuum distillation corresponding to the atmospheric residue. The vacuum residues resulting from the vacuum distillation tower can be used as bitumen. In addition, these residues can optionally be subjected to other treatments in order to modify their mechanical properties, in particular their consistency. The bitumen may be optionally visbroken and/or deasphalted and/or air rectified. The visbreaking corresponds to a conversion process which employs thermal cracking reactions without supplying hydrogen.

The different bitumens obtained by the refining processes can be combined to achieve the best technical compromise.

The bitumen may also be a recycled bitumen or an oxidized bitumen.

The bitumen can be a bitumen of hard or soft grade. For road application, the bitumen is advantageously chosen from bitumens of grades 10/20 to 160/220.

The Bitumen can be selected from bitumens fulfilling one of the following European standards EN 12591, EN 13924-1 (hard grade) or EN 13924-2 (multigrade).

The bituminous composition according to the invention comprises at least 60% by weight of bitumen, preferably at least 80% by weight of bitumen. In particular, the bituminous composition according to the invention comprises from 79 to 99.98% by weight, preferably from 86 to 99.98% by weight, and more preferentially from 90 to 99.9% and more preferentially from 92.8 to 99.8% by weight, of bitumen. Of course, the percentage of bitumen in the composition will be adjusted by the person skilled in the art, in relation with the possible presence of other additives than the amine additive and the hydroxide.

Amine Additive

The bituminous compositions according to the invention contain at least one amine additive which is selected from amines, diamines, polyamines, alkyl amido amines, amidopolyamines and imidazolines. It is possible the bituminous compositions of the invention contain only one amine additive or a mixture of amine additives.

Advantageously, the bituminous compositions according to the invention contain at least one amine additive which is selected from amines, diamines, polyamines, alkyl amido amines and amidopolyamines comprising a fatty chain (ie an aliphatic hydrocarbon chain comprising at least 8 carbon atoms). These amines, diamines, polyamines, alkyl amido amines and amidopolyamines used in the bituminous compositions according to the invention can contain only one or several fatty chains.

Examples of the amines, diamines, polyamines, alkyl amido amines, amidopolyamines and imidazolines employable in the invention are generally depicted by the following general formulae:

a. Amines

wherein R is a saturated or unsaturated, substituted or unsubstituted, optionally branched or cyclic, hydrocarbon radical with 8 to 24 carbon atoms, preferentially an aliphatic hydrocarbon chain comprising at least 8 carbon atoms, for example derived from tallow fatty acids, or tall oil fatty acids. $R_1$ and $R_2$ can be the same or different and are selected from hydrogen or hydrocarbon radical with 1 to 24 carbon atoms. $R_1$ and $R_2$ are preferably selected from hydrogen or methyl.

b. Diamines and Polyamines

wherein R has the same meaning as in (I) above and L represents a linear or branched hydrocarbon radical with 1 to 6 carbon atoms and n is an integer greater than or equal to 1, in particular n is an integer from 1 to 6. In one embodiment L is —$(CH_2)_m$— with m=1, 2 or 3.

c. Alkyl Amido Amines

wherein R, $R_1$, $R_2$ and L have the same meaning as in (I) and (II), above.

d. Amidopolyamines and Imidazolines

wherein R and L have the same meaning as in (I) and (II) above, and p is an integer greater than or equal to 1, in particular p is an integer from 1 to 10.

The amines, diamines, polyamines, alkyl amido amines and amidopolyamines including a fatty chain are mainly obtained from fatty carboxylic acids. Different processes can be used.

For example, the selected fatty carboxylic acids are dehydrated in the presence of ammonia in order to produce nitriles, which are then subjected to catalytic hydrogenation in order to produce primary, secondary or tertiary amines.

According to another process, the selected fatty carboxylic acid(s) is(are) reacted with a polyamine, in order to lead to amidopolyamines comprising both amine and amide functions. For instance, such a fatty amine can be obtained by reaction of the fatty acids of tall oil with a polyethylenepolyamine.

Many other processes leading to diamines, polyamines, alkyl amido amines with a fatty chain can be used.

The starting fatty carboxylic acids are, for example, caprylic, pelargonic, capric, undecylenic, lauric, tridecylenic, myristic, pentadecylic, palmitic, margaric, stearic, nonadecylic, arachic, heneicosanoic, behenic, tricosanoic, lignoceric, pentacosanoic, cerotic, heptacosanoic, montanic, nonacosanoic, melissic, hentriacontanoic or laceroic acids or unsaturated fatty acids such as palmitoleic, oleic erucic, nervonic, linoleic, a-linolenic, c-linolenic, dihomo-c-linolenic, arachidonic, eicosapentaenoic or docosahexanoic acid.

The preferred fatty carboxylic acids result from the hydrolysis of the triglycerides present in vegetable and animal oils, such as coprah, palm, olive, peanut, rapeseed, sunflower, soya, cotton or linseed oil, beef tallow, etc.; fatty acids of tall oil. Natural oils may have been genetically modified so as to enrich their content of certain fatty acids, for example oleic rapeseed or sunflower oil.

The fatty carboxylic acids used for the preparation of amine additive are preferably obtained from natural vegetable or animal resources. The treatments making it possible to obtain an amine additive from natural oils can result in mixtures of amines, diamines, polyamines, alkyl amido amines and/or amidopolyamines.

According to a particular embodiment, the bituminous composition according to the invention includes an amine additive which is an amidopolyamine including a fatty chain of formula:

RCO—[NH-L]$_p$-NH$_2$ (IV)

where:
  p is an integer greater than or equal to 1, in particular p is an integer from 1 to 10,
  L is a linear or branched hydrocarbon radical with 1 to 6 carbon atoms, for instance L is —(CH$_2$)$_m$— with m=1, 2 or 3,
  R is a saturated or unsaturated, substituted or unsubstituted, optionally branched hydrocarbon radical with 8 to 24 carbon atoms.

This group includes the reaction product of fatty acids or esters with complex mixtures of polyethylenepolyamines or polypropylenepolyamines and related compounds which may contain also cyclic and substituted nitrogens obtained as by-products in the manufacture of diethylene triamine and ethylene diamine.

According to a preferred embodiment, the amine additive of the composition is a mixture of amidopolyamines of formula (IV) in which p is an integer from 1 to 10, L is —(CH$_2$)$_2$—, and R are the hydrocarbon chains of the fatty acids of tall oil. According to a particular embodiment, the bituminous compositions according to the invention include only such a mixture of amidopolyamines, as amine additive.

According to a particular embodiment, the bituminous composition according to the invention comprises at most 3% by weight, preferably from 0.01 to 2% by weight, and more preferentially from 0.05 to 1% by weight, and more preferentially from 0.1 to 0.5% by weight, of the amine additive (preferably, an amine, diamine, polyamine, alkyl amido amine or amidopolyamine, including a fatty chain, or one of their mixtures; more preferably an amidopolyamine including a fatty chain of formula (IV) and preferentially a mixture of amidopolyamines of formula (IV) in which p is an integer from 1 to 10, L is —(CH$_2$)$_2$—, and R are the hydrocarbon chains of the fatty acids of tall oil) relative to the total weight of said composition.

Hydroxide

The bituminous compositions according to the invention include a hydroxide XOH, with X=Na, Ca, Mg, Li or K. For simplification, in the specification "hydroxide" can be used for designating "hydroxide XOH". It is possible the bituminous compositions according to the invention comprise one or more than one hydroxide XOH.

According to a particular embodiment, the bituminous composition according to the invention comprises at most 3% by weight, preferably from 0.01 to 2% by weight, and more preferentially from 0.05 to 1% by weight, and more preferentially from 0.1 to 0.7% by weight of the hydroxide XOH with X=Na, Ca, Mg, Li or K, relative to the total weight of said composition.

According to a particular embodiment, the bituminous compositions according to the invention include NaOH and/or KOH, as hydroxide XOH, and advantageously only NaOH, only KOH or a mixture of NaOH and KOH, as hydroxide XOH.

According to a particular embodiment, the bituminous compositions according to the invention include NaOH, as hydroxide XOH, and advantageously only NaOH, as hydroxide XOH.

Other Additives

The present invention can be implemented with all type of bituminous compositions, especially bituminous composition for industrial and road applications, except those specifically excluded in the present invention.

According to a particular embodiment, the bituminous composition according to the invention comprises an olefinic polymer. In particular, the olefinic polymer is selected from the group consisting of (a) ethylene/glycidyl (meth)acrylate copolymers; (b) ethylene/monomer A/monomer B terpolymers and (c) copolymers resulting from the grafting of a monomer B on a polymer substrate. In particular, the olefinic polymer is chosen from the groups (a), (b) and (c) consisting of:

(a) the copolymers of ethylene and glycidyl (meth) acrylate chosen from random and block copolymers, preferably statistic copolymers, of ethylene and a monomer selected from glycidyl acrylate and glycidyl methacrylate, comprising from 50% to 99.7% by weight, preferably from 60% to 95% by weight, more preferably from 60% to 90% by weight of ethylene;
  (b) the terpolymers of ethylene, monomer A and monomer B chosen from random and block terpolymers, preferably statistic terpolymers, of ethylene, a monomer A and a monomer B; the monomer A being selected from vinyl acetate, (C$_1$-C$_6$)alkyl acrylates and (C$_1$-C$_6$)alkylmethacrylates and the monomer B being selected from glycidyl acrylate and glycidyl methacrylate; in particular, the terpolymers ethylene/monomer A/monomer B comprise from 0.5% to 40% by weight, preferably from 5 to 35% by weight, more preferably from 10% to 30% by weight of units resulting from monomer A and from 0.5% to 15% by weight, preferably from 2.5% to 15% by weight of units resulting from monomer B, the rest being formed by units derived from the ethylene;
  (c) the copolymers resulting from the grafting of a monomer B selected from glycidyl acrylate and glycidyl methacrylate, on a polymer substrate; in particular, the polymer substrate comprises a polymer selected from polyethylenes, especially low-density polyethylenes, polypropylenes, random or block copolymers, preferably statistic copolymers, of ethylene and vinyl acetate, random or block copolymer, preferably statistic copolymers, of ethylene and ($C_1$-$C_6$)alkylacrylate or ($C_1$-$C_6$)alkylmethacrylate; advantageously, the copolymers of ethylene and vinyl acetate or of ethylene and ($C_1$-$C_6$)alkylacrylate or ($C_1$-$C_6$)alkylmethacrylate comprise from 40% to 99.7% by weight, preferably from 50% to 99% by weight of ethylene; in particular, such grafted copolymers comprise from 0.5% to 15% by weight, preferably from 2.5% to 15% by weight of grafted units resulting from the monomer B.

The olefinic polymer is preferably selected from the group (b) of terpolymers of ethylene, monomer A and monomer B described above. So, advantageously, the olefinic polymer is selected from random terpolymers of ethylene, a monomer A chosen from ($C_1$-$C_6$)alkylacrylates and ($C_1$-$C_6$)alkylmethacrylates and a monomer B selected from glycidyl acrylate and glycidyl methacrylate, comprising from 0.5% to 40% by weight, preferably from 5 to 35% by weight, more preferably from 10% to 30% by weight of units resulting from monomer A and 0.5% to 15% by weight, preferably from 2.5% to 15% by weight of units resulting from monomer B, the rest being formed by units resulting from the ethylene.

The amount of the olefinic polymer will be adjusted by the person skilled in the art, depending on the nature of the bitumen used.

The bituminous composition according to the invention can also contain any conventional additives used by the person skilled in the art in bituminous compositions, in particular an elastomer. Preferably, the elastomer is chosen among SB copolymers (block copolymer of styrene and butadiene), SBS (styrene-butadiene block copolymer styrene), SIS (styrene-isoprene-styrene), SBS*(block copolymer styrene-butadiene-styrene star), SBR (styrene-b-butadiene-rubber), EPDM (ethylene propylene diene modified). These elastomers may also be cross-linked by any known process, for example with sulfur according to well-known processes.

According to a particular embodiment, the bituminous composition according to the invention comprises, in total, from 0.05% to 15% by weight, preferably from 0.1 to 10% by weight, more preferably from 0.3 to 8% by weight, and preferentially from 0.5 to 6% by weight of conventional additive(s) (in particular corresponding to the total amount of olefinic polymer and elastomer when they are both present) described above relative to the total weight of said composition.

More Details about the Bituminous Compositions

The bituminous compositions according to the invention are substantially free of saponifiable and saponified carboxylic acids.

"substantially free" of a group of components, means that the bituminous composition contains at most 0.01% by weight, of the said group of components (considering the total amount of this group of components), relative to the total weight of the bituminous composition, preferentially at most 0.001% by weight of the said group of components, relative to the total weight of the bituminous composition, and more preferentially the bituminous composition does not contain any component of said group of components.

"substantially free of saponifiable and saponified carboxylic acids" means that, if one or several carboxylic acids are present in the bituminous composition, the total amount of carboxylic acid(s) (whatever the carboxylic acid function is in free form corresponding to the saponifiable form or in anionic form corresponding to the saponified form) in the bituminous composition cannot exceed 0.01% by weight, preferably cannot exceed 0.001% by weight relative to the total weight of said composition.

Saponifiable carboxylic acids may be, in particular, saturated or unsaturated branched or straight chain fatty acids containing from about 12 to about 24 carbon atoms. Examples of saponifiable carboxylic acids include stearic acid, oleic acid, linoleic acid, linolenic acid, and mixtures thereof.

In a particular embodiment, the bituminous compositions according to the invention are substantially free of saponifiable and saponified organic acids. The saponifiable organic acids include all the saponifiable acids including a carbonaceous part, for instance the sulfonic acids.

In particular embodiments, the bituminous compositions according to the invention are substantially free of polyphosphoric acid or, more generally, of any acids, whatever they are in a saponifiable and saponified form.

The weight percentages given in all the description are based on the total weight of the bituminous composition. So, the total percentages of the constituents present in the composition are equal to 100%.

According to a first embodiment, the invention concerns bituminous compositions which comprise and, advantageously are exclusively constituted of:
  a bitumen, in an amount from 94 to 99.98% by weight, preferably from 96 to 99.98% by weight, more preferably from 98 to 99.9% by weight, and more preferentially from 98.2 to 99.8% by weight,
  an amine additive, in an amount of at most 3% by weight, preferably from 0.01 to 2% by weight, more preferably from 0.05 to 1% by weight, and more preferentially from 0.1 to 0.5% by weight and
  a hydroxide XOH, with X=Na, Ca, Mg, Li or K, in an amount of at most 3% by weight, preferably from 0.01 to 2% by weight, more preferably from 0.05 to 1% by weight, and more preferentially from 0.1 to 0.7% by weight.

According to a second embodiment, the invention concerns bituminous compositions which comprise and, advantageously are exclusively constituted of:
  a bitumen, in an amount from 79 to 99.93% by weight, preferably from 86 to 99.88% by weight, more preferably from 90 to 99.6% by weight, and more preferentially from 92.8 to 99.3% by weight,
  an olefinic polymer, in an amount from 0.05 to 15% by weight, preferably from 0.1 to 10% by weight, more preferably from 0.3 to 8% by weight, and more preferentially from 0.5 to 6% by weight,
  an amine additive, in an amount of at most 3% by weight, preferably from 0.01 to 2% by weight, more preferably from 0.05 to 1% by weight, and more preferentially from 0.1 to 0.5% by weight and
  a hydroxide XOH, with X=Na, Ca, Mg, Li or K, in an amount of at most 3% by weight, preferably from 0.01 to 2% by weight, more preferably from 0.05 to 1% by weight, and more preferentially from 0.1 to 0.7% by weight.

According to a third embodiment, the invention concerns bituminous compositions which comprise and, advantageously are exclusively constituted of:
  a bitumen, in an amount from 79 to 99.93% by weight, preferably from 86 to 99.88% by weight, more preferably from 90 to 99.6% by weight, and more preferentially from 92.8 to 99.3% by weight,
  an olefinic polymer and/or an elastomer, in an amount from 0.05 to 15% by weight, preferably from 0.1 to 10% by weight, more preferably from 0.3 to 8% by weight, and more preferentially from 0.5 to 6% by weight, an amine additive, in an amount of at most 3% by weight, preferably from 0.01 to 2% by weight, more preferably from 0.05 to 1% by weight, and more preferentially from 0.1 to 0.5% by weight and a hydroxide XOH, with X=Na, Ca, Mg, Li or K, in an amount of at most 3% by weight, preferably from 0.01 to 2% by weight, more preferably from 0.05 to 1% by weight, and more preferentially from 0.1 to 0.7% by weight.

The preferred ratios given for the first, second and third embodiments are advantageously combined with each other's.

Of course, the bitumen, amine additive, hydroxide XOH with X=Na, Ca, Mg, Li or K, and olefinic polymer and elastomer when present, specifically described or preferred in the previous specification, are preferentially used.

The bituminous compositions according to the invention have a penetrability, measured at 25° C. according to EN 1426, between 5 and 300¹/₁₀ mm, preferably between 10 and 100¹/₁₀ mm, more preferably between 30 and 100¹/₁₀ mm.

The bituminous compositions according to the invention have a ring and ball softening temperature, measured according to EN 1427, preferably less than or equal to 90° C., and preferably between 30° C. and 90° C.

The inventors have compared the penetrability and the ring and ball softening temperature of the bituminous compositions according to the invention, with those obtained with the same bituminous compositions, but without the incorporation of hydroxide and the amine additive, and the evolution of these two parameters under solicitations, in particular to evaluate their resistance to hardening and their resistance to long term ageing. These evaluations under solicitations can be carried out according to EN 12607-1 and EN 14769.

Surprisingly, they have found that the addition of both the hydroxide and the amine additive according to the invention leads to an improved stability of the penetrability at 25° C. and/or to an improved stability of the ring-and-ball softening temperature. Most of all, this improved stability over time, when the bituminous compositions according to the invention are used in a bituminous mix for roads comprising aggregates, the adhesive force and the resistance to crackings are not impaired. The results obtained according to EN 12697-22 may even been improved.

So, the invention also concerns the incorporation of an amine additive and a hydroxide XOH, with X=Na, Ca, Mg, Li or K in a bituminous composition comprising a bitumen and optionally an olefinic polymer and/or an elastomer for improving the stability of the penetrability of the bituminous composition at 25° C. measured according to EN 1426 and/or for improving the stability of the ring-and-ball softening temperature of the bituminous composition measured according to EN 1427, under solicitations. The conditions of solicitations are defined in EN 12607-1 and/or EN 14769. The improvement is considered in comparison with the same bituminous composition, differing only by the absence of both the amine additive and the hydroxide. The choice and quantity of the constituents and the definition of the bituminous compositions are preferably according to the previous description of the invention.

Additionally, the inventors have found that the addition of both the hydroxide and the amine additive according to the invention improve the capture of hydrogen sulfide $H_2S$ and act as $H_2S$ scavengers. $H_2S$ emissions that may occur during the storage and transportation of bituminous compositions can cause both safety and odor issues. The elimination of these emissions is a continuous issue for the bitumen industry.

So, the invention also concerns the incorporation of an amine additive and a hydroxide XOH, with X=Na, Ca, Mg, Li or K in a bituminous composition comprising a bitumen and optionally an olefinic polymer and/or an elastomer for reducing the $H_2S$ emission or content of the bituminous composition. When the bitumen composition is heated in a liquid form, the content of $H_2S$ can be evaluated by the measurement of the H2S content in the liquid phase. The emission of $H_2S$ can be evaluated by the measurement of the H2S liberated in gaseous form, when the bitumen composition is heated until a liquid form. The evaluation may be carried out after 5 days of storage in a closed tank under 180° C. The reduction is considered in comparison with the same bituminous composition, differing only by the absence of both the amine additive and the hydroxide. The choice and quantity of the constituents and the definition of the bituminous compositions are preferably according to the previous description of the invention.

The bituminous composition according to the invention may be in any form suitable for the selected application. According to a particular embodiment, the bituminous composition according to the invention is packaged under the form of block or in bags made of heat fusible material or in thermofusible material buckets. It is mean by "under the form of block", rectangular blocks, preferably paved bitumen, having a volume of between 10 000 and 30 000 cm³, preferably between 14 000 and 20 000 cm³ and/or a mass between 10 and 30 kg, preferably between 14 and 20 kg. These blocks are advantageously wrapped within a thermoplastic film or contained in a carton having inner face of wall in silicone.

Manufacturing Method of the Bituminous Compositions

According to the invention, an amine additive and a hydroxide XOH, with X=Na, Ca, Mg, Li or K, are introduced in a bituminous composition. The amine additive and the hydroxide XOH can be incorporated to the bituminous composition comprising the bitumen alone or together, but preferably without another component at the same time.

The order of introduction of the different constituents of a bituminous composition according to the invention does not appear to influence the mechanical and/or stability properties of the bituminous composition thus obtained.

Nevertheless, it will be preferable to add the hydroxide XOH before the amine additive.

Preferably, the hydroxide is substantially dry and in finely-divided particulate form when introduced in the composition.

When an olefinic polymer or another additive is present in the composition, it will also be mixed with the other components.

In a preferred embodiment, the different constituents are added subsequently. Preferably, when an olefinic polymer and/or another additive is present in the composition, this (these) is(are) added first to the bitumen, after the hydroxide XOH is added and at the end the amine additive.

Obviously, as the bituminous composition according to the invention is substantially free of saponifiable and saponified carboxylic acids, such components are not incorporated in the bituminous composition according to the invention.

The different components of the bituminous composition are mixed at a temperature in the range of 90 to 230° C., preferably of 120° to 200° C. The mixture of the different constituents of the bituminous composition is conventionally obtained under stirring, for instance during a period of time of at least five minutes, preferably from 5 minutes to 10 hours, more preferably from 10 minutes to 5 hours, more preferably from 20 minutes to 4 hours.

Uses of the Bituminous Compositions

The bituminous compositions according to the invention can be used in the fields of road applications or in the fields of industrial applications. Whatever the field of application, the bituminous composition is used as a bituminous binder and is shaped and/or associated with other components under heat. Conventionally, the heating temperature is in the range 80 to 240° C., more preferably in the range of 90 to 230° C.

In road applications, the bituminous composition according to the invention is, in particular, used for the manufacture of hot bituminous mixes, asphalts or surface coatings. For instance, the bituminous composition according to the invention may be included in bituminous mixes as materials for the construction and the maintenance of road foundations and their surfacing, and for all road works. Thus, the present invention also concerns a method of road building comprising combining the bituminous composition according to the invention with aggregates and/or inorganic and/or synthetic fillers under heat and applying the obtained material to form a part of the road.

The bituminous composition according to the invention can be employed to prepare a combination with aggregates, advantageously with road aggregates, in particular to form a bituminous mix.

A bituminous mix is understood to mean a mixture of a bituminous composition with aggregates and optionally inorganic and/or synthetic fillers. In general, the aggregates and the inorganic and/or synthetic fillers, when they are present, represent from 90 to 96%, preferably from 94.5 to 95% by weight of the bituminous mix and the bituminous composition from 4 to 10%, preferably from 5 to 5.5% by weight of the bituminous mix.

The aggregates are inorganic and/or synthetic aggregates, in particular, recycled milled products, with dimensions of greater than 2 mm, preferably of between 2 mm and 20 mm. Inorganic and/or synthetic fillers are preferably chosen from fines, sand, stone chips and recycled milled products.

As regards the road applications, the invention is also targeted at asphalts as materials for constructing and covering sidewalks. Asphalt is understood to mean a mixture of a bituminous composition with inorganic and/or synthetic fillers. Such an asphalt comprises a bituminous composition according to the invention and inorganic fillers, such as fines, sand or stone chips, and/or synthetic fillers. The inorganic fillers are composed of fines (particles with dimensions of less than 0.063 mm), of sand (particles with dimensions of between 0.063 mm and 2 mm) and optionally of stone chips (particles with dimensions of greater than 2 mm, preferably of between 2 mm and 4 mm).

The asphalts exhibit 100% compactness and are mainly used to construct and cover sidewalks, whereas the mixes have a compactness of less than 100% and are used to construct roads. Unlike the mixes, the asphalts are not compacted with a roller when being put in place.

The invention also concerns:
bituminous mixes consisting in a bituminous composition according to the invention and aggregates, or consisting in a bituminous composition, aggregates and fillers which may be inorganic and/or synthetic,
asphalts consisting in a bituminous composition according to the invention and fillers which may be inorganic and/or synthetic.

In industrial applications, the bituminous composition according to the invention is, in particular, used for the manufacture of internal or external coatings.

So, another aspect of the invention is the use of a bituminous composition according to the invention, in various industrial applications, in particular for preparing a leaktight coating, a membrane or a seal coat.

As regards the industrial applications of the bituminous compositions, mention may be made of the preparation of leaktight membranes, of noise-reduction membranes, of insulting membranes, of surface coatings, of carpet tiles or of seal coats.

The present invention also concerns a method of applying an internal or external coating on a surface, comprising heating the bituminous composition according to the invention and applying it to the surface.

EXAMPLES

The needle penetrability was measured at 25° C. according to the standard DIN EN 1426 (Penetration at 25° C. in the Table).

The ring and ball softening temperature was measured according to the standard DIN EN 1427 (softening point (R+B) in the Table).

The resistance of the bituminous compositions against hardening and ageing was respectively tested according to the standards DIN EN 12607-1 and DIN 12607-1+14769.

The European Standard DIN EN 12607-1 specifies a method for measuring the combined effects of heat and air on a thin film of a bituminous composition in constant renewal. It simulates the hardening undergone by a bituminous composition during mixing before coating applications.

The European Standard DIN EN 12607-1+14769 specifies a method for accelerated long-term aging carried out in a pressure aging vessel (PAV).

The affinity between aggregates and the bituminous compositions was evaluated at 25° C. according to the standard DIN EN 12697-11. The rotation speed was 60 min$^{-1}$ and the size and the type of the aggregates were respectively 8-11.2 mm Quartzite. The mean value of the bitumen coating expressed in % is presented in the Table.

The wheel tracking of the bitumen compositions was evaluated at 40° C. according to the standard DIN EN 12697-22.

Conditions:
T=40° C.
In air
Solid rubber while
40 mm thickness weal
AC 8 D N type of Asphalt
A bituminous composition according to the invention was prepared with:
A bitumen A with a Penetration measured at 25° C. according the standard DIN EN 1426 of 77 mm/10 and a softening point (R+B) measured according to the standard DIN EN 1427 of 46.8° C. (grade 70/100).
A powder of NaOH 97% (Aldrich) or a powder of KOH 97% (Aldrich)
An amine additive marketed by AkzoNobel under the name Wetfix BE (CAS 68910-93-0).
The preparation protocol was the following:
Temperature of bitumen: 180° C.
0.5% w/w dried NaOH (Example 1) or KOH (Example 2) added and stirred for 3 hours,
0.2% w/w Wetfix BE added and stirred for ½ hour.

The bituminous compositions according to the invention and the same composition, but without NaOH or KOH and without the amine additive (Comparative Example), were tested. A bitumen B (AZALT), with a Penetration measured at 25° C. according the standard DIN EN 1426 of 58 mm/10 and a softening point (R+B) measured according to the standard DIN EN 1427 of 51° C. (grade 50/70), was also tested The results are presented in the Table hereafter.

The results show that the combined use of NaOH or KOH and of the amine additive highly improved the resistance to hardening and ageing with respect to both needle penetrability at 25° C. and ring and ball softening temperature. The ageing is slowed down.

Additionally, the tests on the affinity between aggregates and the bitumen compositions show that the adhesive force of the bituminous composition is maintained. On the contrary, the adhesive force is totally lost in case of use of NaOH alone (results not shown).

In the wheel tracking test, the addition of NaOH or KOH and of the amine additive, in comparison with the bitumen A, shows a great improvement to crackings resistance.

TABLE

| Test, Unit | Test Method DIN EN | Comparative example Bitumen A | Example 1 according to the invention (NaOH) | Example 2 according to the invention (KOH) | Comparative example Bitumen B |
|---|---|---|---|---|---|
| Grade | | 70/100 | 50/70 | 50/70 | 50/70 |
| Softening Point (R + B), ° C. | 1427 | 46.8 | 53.6 | 51.8 | 51 |
| Penetration at 25° C., mm/10 | 1426 | 77 | 60 | 62 | 58 |
| Resistance to hardening RTFOT | 12607-1 | | | | |
| Softening Point (R + B), ° C. | 1427 | 52.2 | 56.4 | 54.8 | 58.4 |
| Increase of Softening Point (R + B), ° C. | 1427 | +5.4 | +2.8 | +3.0 | +7.4 |
| Penetration at 25° C., mm/10 | 1426 | 47.7 | 48 | 50.8 | 39.4 |
| Retained Penetration, % | 1426 | 62 | 80 | 82 | 68 |
| Resistance to long term ageing RTFOT + PAV | 12607-1 + 14769 | | | | |
| Softening Point (R + B), ° C. | 1427 | 60.8 | 61.8 | 61 | 67.2 |
| Increase of Softening Point (R + B), ° C. | 1427 | +14 | +8.2 | +9.2 | +16.2 |
| Penetration at 25° C., mm/10 | 1426 | 24.6 | 31.2 | 32.2 | 22.0 |
| Retained Penetration, % | 1426 | 32 | 52 | 52 | 38 |
| Mean value of the bitumen coating | 12697-11 | | | | |
| 6 h, % | | 60 | 55 | 50 | 55 |
| 24 h, % | | 35 | 35 | 35 | 35 |
| 48 h, % | | 30 | 25 | 20 | 30 |
| Wheel Tracking | 12697-22 | 8.7 mm | 1.8 mm | 1.8 mm | 2.0 mm |

The invention claimed is:

1. A bituminous composition comprising:
   a bitumen, representing from 79 to 99.8% by weight of the bituminous composition;
   a hydroxide XOH, with X=Na or K, representing from 0.3 to 0.9% by weight of the bituminous composition; and
   an amine additive representing 0.2% by weight of the bituminous composition, wherein the amine additive is obtained by reaction of fatty acids of tall oil with a polyethylenepolyamine
   wherein said bituminous composition is substantially free of saponifiable and saponified carboxylic acids, meaning that, if present, the weight of saponifiable and saponified carboxylic acids represents, at most, 0.01% of the total weight of said bituminous composition.

2. The bituminous composition according to claim 1, wherein the bitumen represents from 86 to 99.8% by weight of bitumen of said bituminous composition.

3. The bituminous composition according to claim 1, wherein the hydroxide XOH with X=Na or K represents from 0.3 to 0.7% by weight of said bituminous composition.

4. The bituminous composition according to claim 1, wherein the hydroxide XOH is NaOH.

5. The bituminous composition according to claim 1, wherein said bituminous composition further comprises an olefinic polymer.

6. The bituminous composition according to claim 5, wherein the olefinic polymer is selected from the group consisting of:

(a) the copolymers of ethylene and glycidyl (meth) acrylate chosen from random and block copolymers of ethylene and a monomer selected from glycidyl acrylate and glycidyl methacrylate, comprising from 50% to 99.7% by weight of ethylene;

(b) the terpolymers of ethylene, monomer A and monomer B chosen from random and block terpolymers of ethylene, a monomer A and a monomer B; the monomer A being selected from vinyl acetate, ($C_1$-$C_6$) alkylacrylates, and ($C_1$-$C_6$) alkylmethacrylates, and the monomer B being selected from glycidyl acrylate and glycidyl methacrylate; the terpolymers ethylene/monomer A/monomer B comprising from 0.5% to 40% by weight of units resulting from monomer A and from 0.5% to 15% by weight of units resulting from monomer B, the rest being formed by units derived from the ethylene; and (c) the copolymers resulting from the grafting of a monomer B selected from glycidyl acrylate and glycidyl methacrylate on a polymer substrate; the polymer substrate comprises a polymer selected from polyethylenes, random or block copolymers of ethylene and vinyl acetate, random or block copolymers of ethylene and ($C_1$-$C_6$) alkylacrylate or ($C_1$-$C_6$) alkylmethacrylate; the copolymers of ethylene and vinyl acetate, or of ethylene and ($C_1$-$C_6$) alkylacrylate, or ($C_1$-$C_6$) alkylmethacrylate comprise from 40% to 99.7% by weight of ethylene; such grafted copolymers comprise from 0.5% to 15% by weight of grafted units resulting from the monomer B.

7. The bituminous composition according to claim 1, wherein said bituminous composition also comprises an elastomer.

8. A process for preparing a bituminous composition according to claim 1, said process comprising mixing the following components at a temperature range of 90 to 230° C.:
  a bitumen in an amount of from 79 to 99.8% by weight of the bituminous composition,
  a hydroxide XOH with X=Na or K in an amount of from 0.3 to 0.9% by weight of the bituminous composition, and
  an additive in an amount of 0.2% by weight of the bituminous composition, said additive being obtained by reaction of fatty acids of tall oil with a polyethylenepolyamine,
  wherein said bituminous composition is substantially free of saponifiable and saponified carboxylic acids, meaning that, if present, the weight of saponifiable and saponified carboxylic acids represents, at most, 0.01% of the total weight of said bituminous composition.

9. The process according to claim 8, further comprising mixing an olefinic polymer and/or an elastomer with the other components.

10. A method for improving the stability under solicitations of the penetrability at 25° C. measured according to EN 1426, and/or for improving the stability of the ring-and-ball softening temperature measured according to EN 1427 of a bituminous composition, said composition comprising a bitumen in an amount of from 79 to 99.8% by weight of the bituminous composition, and, optionally, an olefinic polymer and/or an elastomer, said method comprising incorporating in the bituminous composition, a hydroxide XOH, with X=Na or K, in an amount of from 0.3 to 0.9% by weight of the bituminous composition, and an amine additive in an amount of 0.2% by weight of the bituminous composition, said additive being obtained by reaction of fatty acids of tall oil with a polyethylenepolyamine,
  wherein said bituminous composition is substantially free of saponifiable and saponified carboxylic acids, meaning that, if present, the weight of saponifiable and saponified carboxylic acids represents, at most, 0.01% of the total weight of said bituminous composition.

11. The method according to claim 10 wherein the conditions of solicitations are defined in EN 12607-1 or EN 14769.

12. A method for reducing the $H_2S$ emission or $H_2S$ content of a bituminous composition; comprising a bitumen in an amount of from 79 to 99.8% by weight of the bituminous composition, and, optionally, an olefinic polymer and/or an elastomer, said method comprising incorporating in the bituminous composition, a hydroxide XOH, with X=Na or K, in an amount of from 0.3 to 0.9% by weight of the bituminous composition, and an amine additive in an amount of 0.2% by weight of the bituminous composition, said additive being obtained by reaction of fatty acids of tall oil with a polyethylenepolyamine,
  wherein said bituminous composition is substantially free of saponifiable and saponified carboxylic acids, meaning that, if present, the weight of saponifiable and saponified carboxylic acids represents, at most, 0.01% of the total weight of said bituminous composition.

* * * * *